METHOD AND APPARATUS FOR PRODUCING COLOUR TELEVISION SIGNALS

Filed Dec. 17, 1965 2 Sheets-Sheet 1

Inventor:
Gerhard Krause

Inventor:
Gerhard Krause

United States Patent Office
3,407,265
Patented Oct. 22, 1968

3,407,265

METHOD AND APPARATUS FOR PRODUCING COLOUR TELEVISION SIGNALS

Gerhard Krause, Darmstadt, Germany, assignor to Fernseh G.m.b.H., Darmstadt, Germany Filed Dec. 17, 1965, Ser. No. 514,588
Claims priority, application Germany, Dec. 24, 1964, F 44,804
3 Claims. (Cl. 178—5.4)

ABSTRACT OF THE DISCLOSURE

Means for producing a colour television signal using a line reseau having strips of two colours alternating with transparent (i.e. white) strips. Colour signals and white signals are generated by scanning the reseau and are separated according to the strips from which they originate. The white signals and the colour signals are compared to generate pure colour signals. Various white and colour signals are combined and filtered to generate different frequency ranges of the brightness signal which are then combined to generate the total brightness signal.

The invention concerns a method and an apparatus for producing colour television signals by means of a television camera tube.

Apart from the conventional method of producing a colour television signal by means of three camera tubes on the photo-sensitive surfaces of which identical images in three different basic colours are depicted, and wherein the television signal is obtained by a combination of the three colour separation signals, it is already known to obtain colour signals by means of a single camera tube on the photo-sensitive surface of which the image is formed by means of coloured strip filters. The colour signals are obtained from the signal supplied by the tube by separating out the signal portions corresponding to the colour strips. For synchronising the colour signals it is already known to project "white" strips on the photo-surface of the tube, by means of which synchronising impulses are obtained. A brightness signal may be obtained by means of a second camera tube, on the photo-surface of which an image is projected containing all colours.

The object of the invention is to produce a complete colour television signal by means of a single camera tube the signal containing both the brightness and the colour information.

According to the present invention a method of producing colour television signals by means of a television camera tube on the photo-sensitive surface of which a colour picture is projected through a line reseau having colour strips arranged at right angles to the line scan direction of the camera tube and in which the signal supplied by the camera tube is divided into signal portions corresponding to the colour strips during scanning is characterised by the feature that the reseau comprises transparent (white) strips with a transmission-ratio substantially 1, interspersed with colour strips with a "white" transmission ratio less than 1, the colour strips appearing in succession, a brightness signal being derived from the "white" signal portions of all the strips while colour signals are derived from the colour signal portions of the colour strips.

The line reseau for carrying out the method in accordance with the invention is preferably so formed that each "white" strip is followed by a colour strip, there being two basic colours, preferably red and green, which repeat alternately. The width of each strip on the photo-surface is substantially equal to the length of a standard picture dot in line direction.

To obtain a brightness signal the "white" signal produced by the white strips of the filter and the "white" signal portion of the signal derived from the coloured strips are combined in a predetermined ratio.

The method described enables the production of a brightness signal using only a single camera tube, with the full resolution of a standard television transmission and the production of colour signals with less resolution. For the colour information this lesser colour resolution is found to be immaterial so long as the brightness resolution is unaffected.

The invention will now be described further by way of example with reference to the accompanying drawings, in which.

Figure 1:
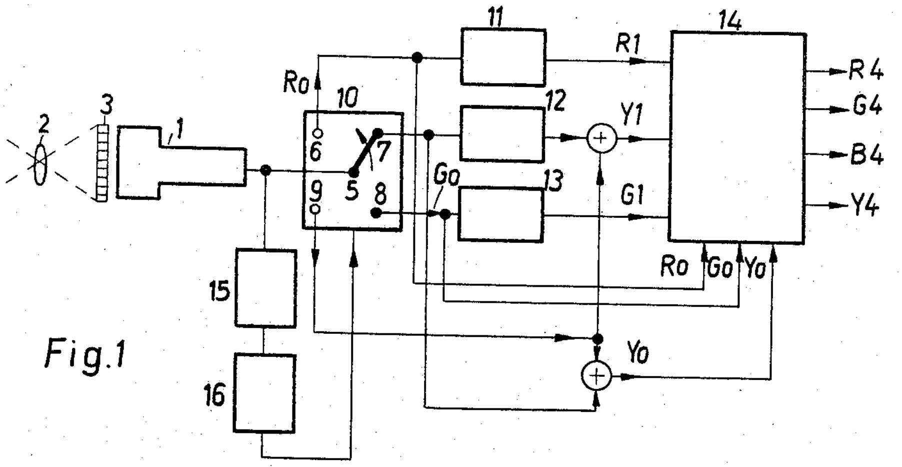
FIG. 1 is a block circuit diagram of an apparatus for carrying out the method in accordance with the invention.

In FIG. 1 the numeral 1 designates a camera tube, e.g. of the Superorthicon type. A strip reseau 3 is arranged in front of the photo-sensitive surface of the camera tube, through which the image of the coloured object to be transmitted is depicted by means of the lens 2 on the said surface. The strip divisions of the filter 3 are arranged at right angles to the direction of the line scan in the camera tube 1. It is also possible to arrange the strip reseau in an intermediate image plane; then the filter size is independent of the size of image on the photo-surface of the camera tube and may be larger than the latter, thus facilitating the manufacture of the reseau.

Figure 2:
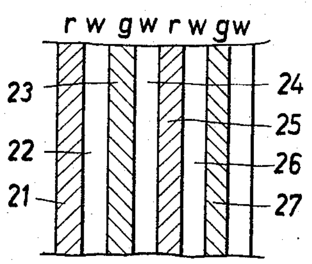
FIG. 2 is a fragmentary view of a strip reseau suitable for the method.

FIG. 2 shows an enlarged portion of the reseau 3. As scanned, the sequence includes transparent strips 22, 24, 26, and alternate colour strips in two basic colours, e.g. 23, 27 green, and 21, 25, red. In accordance with a feature of the invention the colour strips are permeable not only to the spectral range of the basic colour concerned, but also with a lesser transparency to all the remaining colours, i.e. partially transparent to white light. Thus if white light falls on a colour strip, there is not only obtained a spectral proportion corresponding to the basic colour concerned, but also a proportion of all the remaining colours, weakened relative to their original intensity thus producing an unsaturated transmitted colour. The maximum colour saturation depends upon the conditions obtainable in the colour channels and in the brightness channel.

Figure 3:
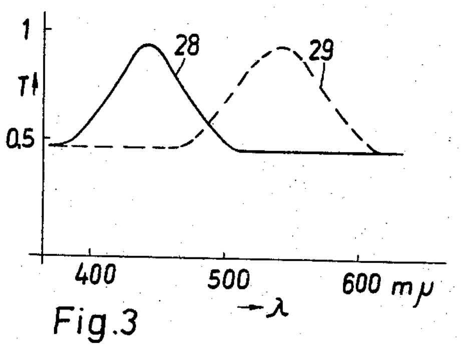
FIG. 3 is a graph of the transparency of the strips of the reseau according to FIG. 2 against the wavelength of incident light.

FIG. 3 shows graphs of the transmission characteristics of the colour strips in dependence upon the light wavelength. The strips 21, 25 in FIG. 2 have their maximum transparency (as near as possible to 1) at about 440 m./u. Their light transmission is reduced for shorter and longer wavelengths to a value of approximately 0.5. The same applies to the colour strips 23, 27 (FIG. 2), which have a maximum transparency at approx. 540 m./u.

The signal produced by the camera tube 1 (FIG. 1) arrives at a cyclically operating electronic switch 10, which associates three different transmission channels with the three different optical paths of varying spectral dependency. For synchronising the switch 10 with the movement of the electron beam in the camera tube, synchronisation information is derived from the image signal by means of the devices 15 and 16. For this purpose the fact is used that the image signal produced by the transparent strips has the maximum amplitude. By means of an amplitude filter 15 the signal peaks are separated which occur when scanning a transparent strip. These signal peaks synchronise a flywheel oscillator 16 which in turn generates impulses for actuating the switch 10 at the right periods. Since this synchronisation is produced by the movement of the scanning beam over each line, the linearity of the scanning rate and the accuracy of the strip reseau are immaterial.

The information derived from the signal by means of the switch 10 for the two basic colours, $R_0$, $G_0$, and the brightness $Y_0$, arrive via delay networks 11, 12, 13 devised to compensate for the transit time of the scanning beam between the image elements adjacent in line direction, and also undelayed at the device 14, in which the colour signals $R_1$, $G_1$ and the brightness signal $Y_1$ are employed to form the three-colour signals $R_4$, $G_4$, $B_4$ and the brightness signal $Y_4$.

Figure 4:
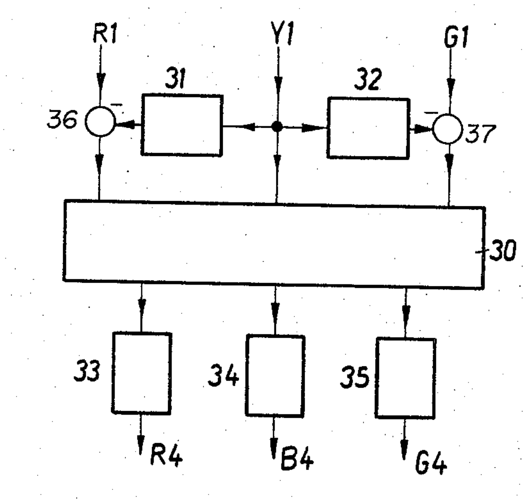
FIG. 4 is a block circuit diagram of an apparatus for modulating the signal of the colour information.

FIG. 4 shows schematically the means 14 for obtaining the said colour signals. Here the spectrum-independent portion contained in the signals $R_1$, $G_1$ is compensated for by subtraction of a spectrum-independent signal portion of equal size derived from the brightness signal $Y_1$. The signal portions for compensation are produced in correct magnitude by the devices 31 and 32 and subtracted in the devices 36 and 37 from the red signal $R_1$ or the green signal $G_1$.

The pure colour signals obtained in this manner for red and green, and the brightness signal, are then converted in a matrix 30 in known manner into three-colour signals for red, green and blue, $R_4$, $G_4$, $B_4$, after having been passed through low-pass filters 33, 34, 35 for conversion of the discontinuous into substantially continuous signals.

If the spaces between the strips of the reseau 3 are so chosen that the width of a strip corresponds to the length of an image element in line direction in the television standard employed, then with the apparatus shown in FIG. 4 colour signals are obtained having a quarter of the maximum image frequency $F_{max}$ of 5 mc./s.

To obtain the resolution of 1.5 mc./s. in the colour channels corresponding to the accepted colour television standard, the width of the strips of the reseau would have to be so selected that a line raster of similar spacing would supply a frequency of 6 mc./s.

It is possible to use filters in which a white strip and a colour strip succeed one another for three basic colours, e.g. red, green and blue. For the same resolution of 1.5 mc./s. in the colour channels the resolution of the camera would then have to involve a frequency of 9 mc./s.

Figure 5:
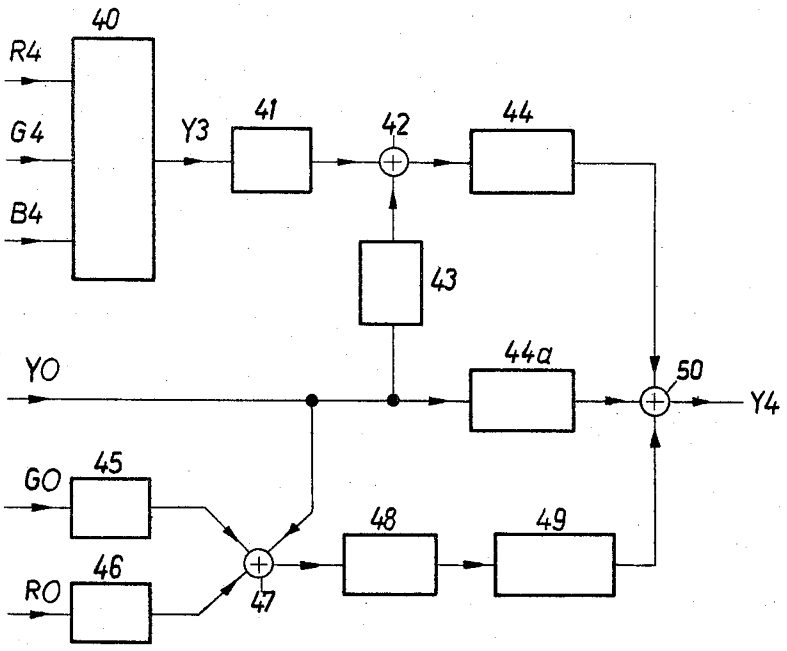
FIG. 5 is a block circuit diagram of an apparatus for modulating the brightness signal.

FIG. 5 shows a block schematic of that part of the module 14 which supplies the brightness signal. In the module 40 the colour signals $R_4$, $B_4$, $G_4$ obtained by means of the device according to FIG. 4 are re-assembled to form a single brightness signal $Y_3$. This brightness signal, however, has a lesser resolution than the maximum resolution according to the television standard used of ¼ of the maximum image frequency of the system, e.g. 1.25 mc./s. at 5 mc./s. maximum image frequency. The signal $Y_3$ is attenuated by 50% in the apparatus 41 and at 42 is united with the signal $Y_0$ also attenuated by 50% in the apparatus 43. The brightness signal obtained in this manner is separated by means of a low-pass filter 44 having an upper limit frequency equal to ¼ of the maximum image frequency, e.g. 1.25 mc./s. at 5 mc./s. maximum frequency, from the higher frequency signals which contain no colour information.

To obtain the higher image frequencies in the brightness signal the spectrum-independent signal portion contained in the colour channels is used. The unsaturated colour signals $G_0$ and $R_0$ arrive at the modules 45, 46, the transmission ratios of which are so chosen that the emitted signal amplitudes, when the photo-cathode is irradiated with white light, equals the signal amplitude of the brightness signal $Y_0$. The signals emitted from 45, 46 and the brightness signal $Y_0$ are added in the gate 47 and the brightness signal assembled in this manner attenuated in the device 48 to ⅓ of its previous amplitude. The high pass filter 49 permits only the brightness signal to pass therethrough in the frequency range between $\frac{1}{2}f_{max}$ and $f_{max}$.

The medial frequency of $\frac{1}{4}$–$\frac{1}{2}f_{max}$ is obtained from the brightness signal $Y_0$ and transmitted over the band filter 44*a*. The three frequency bands of the brightness signal of $0$–$0.25f_{max}$, $0.25$–$0.5f_{max}$ and $0.5$–$1f_{max}$ thus obtained are finally added at the gate 50 and supply a brightness signal $Y_4$ with the full frequency range of $0$–$f_{max}$.

According to the method of the invention, when white light is received the full standard resolution is obtained. In the case of monochrome light having a colour saturation of e.g. 50%, the modulation depth at high frequencies is diminished by about 10–15%, dependent upon the chosen colour saturation of the colour strip of the reseau.

Figure 6:
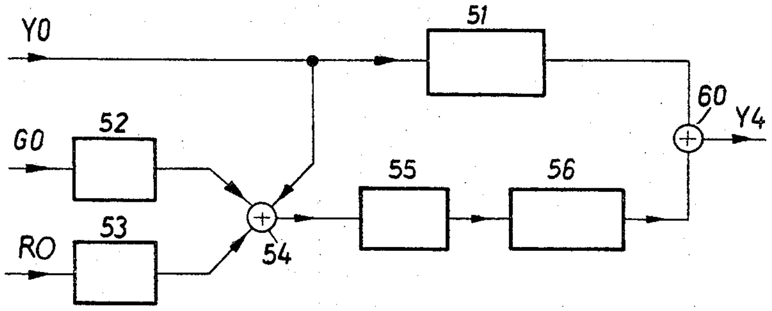
FIG. 6 is a block circuit diagram of an alternative apparatus for obtaining the brightness signal.

FIG. 6 shows an alternative device for obtaining the brightness signal. From the signal portions $R_0$, $G_0$ and $Y_0$ divided by the switch 10 the lower frequency range of the brightness signal $Y_0$ of $0$–$0.5f_{max}$ arrives via a low-pass filter 51 directly to the "add" gate 60 of the apparatus. The transmission ratio of the colour signals $G_0$ and $R_0$ is so chosen by means of the devices 52, 53 that, as in the apparatus according to FIG. 5, the emergent signals from modules 52, 53, when the camera receives white light, have the same amplitude as the signal $Y_0$. The two reduced portions of the colour signals are combined with one another at gate 54, and with the signal $Y_1$. The combined brightness signal, which contains the higher frequencies, is now attenuated in network 55 to ⅓ of its value and arrives with the limit frequency $0.5f_{max}$ via the low-pass filter 56 at the addition stage 60, where it is united with the lower frequency band output of the low-pass filter 51 to form a brightness signal $Y_4$ with the full frequency range of 5 mc./s.

I claim:

1. In an apparatus for producing colour television signals by means of a television camera tube, said apparatus comprising:

(a) a line reseau having interposed colour strips transparent to a proportion of coloured light and a proportion of white light and white strips transparent to white light, said colour strips being separated by white strips and occurring in alternating succession between a first basic colour and a second basic colour, (b) scanning means for developing a signal representing the intensity of light transmitted by the respective strips of said reseau, (c) distributor means for dividing said signal into at least three signal portions respectively corresponding to the light transmitted by said white strips, said strips of a first basic colour, and said strips of a second basic colour and for distributing these signal portions respectively to a first, a second and a third signal channel and, (d) delay means for adjusting the relative delay of said three signal portions in the three said channels, the improvement comprising:

(e) attenuating means for attenuating said first channel signal portion to the minimum level of said second and third channel signal portions, said minimum level corresponding to the passage of light of other than the basic colours through the respective colour strips, said attenuating means having at its output compensation signals corresponding to said minimum levels, (f) means for subtracting said compensation signals from said signal portions corresponding to said strips of a first basic colour and from said signal portions corresponding to said strips of a second basic colour, respectively, to generate first pure colour signals and second pure colour signals and, (g) means for combining said first channel signal portion with said first and second pure colour signals to derive a further pure colour signal corresponding to another basic colour.

2. Apparatus according to claim 1 further comprising:

(a) first filter means responsive to said first, said second and said further pure colour signals and to said first channel signal portion for deriving the low frequency portion of a brightness signal, said low frequency portion of a brightness signal, said low frequency being up to one quarter of the maximum picture frequency as determined by the total number of strips in said reseau, (b) second filter means responsive to said first, second, and third channel signal portions to combine said signal portions in a predetermined ratio for deriving the high frequency portions of said brightness signal, said high frequency being above half said maximum picture frequency, (c) third filter means responsive to said first channel signal portion to derive the medial portions of said brightness signal and, (d) means to combine the three portions of said brightness signal to form said brightness signal.

3. Apparatus according to claim 1 further comprising:

(a) means responsive to a signal representing the light originating from said white strips for generating the lower frequencies of a brightness signal, (b) means responsive to said signal representing the light originating from said white strips and to one of said signal portions corresponding to the light transmitted by strips of a basic colour for generating the higher frequencies of said brightness signal and, (c) means for combining said lower frequencies and said higher frequencies of said brightness signal to generate said brightness signal.

References Cited

UNITED STATES PATENTS

| | | | |
|---|---|---|---|
| 2,865,985 | 12/1958 | Borkan et al. | 178—5.4 |
| 2,899,489 | 8/1959 | Cheetham et al. | 178—5.4 |

ROBERT L. GRIFFIN, *Primary Examiner.*

RICHARD MURRAY, *Assistant Examiner.*